(12) United States Patent
Wu et al.

(10) Patent No.: US 8,728,637 B2
(45) Date of Patent: *May 20, 2014

(54) CORROSION RESISTANT GRANULAR MAGNETIC STACK

(75) Inventors: Michael Zyee-Shan Wu, San Jose, CA (US); Mason Lu, Fremont, CA (US); Kueir W. Chour, San Jose, CA (US); Connie C. Liu, San Jose, CA (US); Edward T. Yen, San Jose, CA (US); Lynn Li, Chanhassen, MN (US); Steve Hwang, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/687,751

(22) Filed: Jan. 14, 2010

(65) Prior Publication Data

US 2010/0119877 A1  May 13, 2010

Related U.S. Application Data

(63) Continuation of application No. 11/407,927, filed on Apr. 21, 2006, now Pat. No. 7,691,499.

(51) Int. Cl.
  *G11B 5/66* (2006.01)
(52) U.S. Cl.
  USPC ............ 428/827; 428/829; 428/830
(58) Field of Classification Search
  None
  See application file for complete search history.

(56) References Cited

U.S. PATENT DOCUMENTS

| | | | | |
|---|---|---|---|---|
| 6,861,126 B2* | 3/2005 | Fujiki | ............ | 428/212 |
| 7,132,176 B2* | 11/2006 | Iwasaki et al. | ............ | 428/829 |
| 7,169,488 B2* | 1/2007 | Chen et al. | ............ | 428/833.3 |
| 7,691,499 B2* | 4/2010 | Wu et al. | ............ | 428/827 |
| 2003/0180577 A1* | 9/2003 | Do et al. | ............ | 428/694 TM |
| 2004/0013910 A1* | 1/2004 | Acharya et al. | ............ | 428/694 ST |
| 2004/0050688 A1* | 3/2004 | Kanazawa et al. | ............ | 204/192.12 |
| 2004/0185308 A1* | 9/2004 | Koda et al. | ............ | 428/694 TS |
| 2005/0153169 A1* | 7/2005 | Watanabe et al. | ............ | 428/694 BM |
| 2005/0196642 A1* | 9/2005 | Nakamura et al. | ............ | 428/832 |
| 2006/0147759 A1* | 7/2006 | Lee et al. | ............ | 428/830 |
| 2006/0204791 A1* | 9/2006 | Sakawaki et al. | ............ | 428/828.1 |
| 2006/0246323 A1* | 11/2006 | Liu et al. | ............ | 428/829 |
| 2006/0286413 A1* | 12/2006 | Liu et al. | ............ | 428/829 |
| 2008/0070065 A1* | 3/2008 | Berger et al. | ............ | 428/828.1 |

* cited by examiner

Primary Examiner — Kevin Bernatz

(57) ABSTRACT

A corrosion-resistant granular magnetic recording medium with improved recording performance comprises a non-magnetic substrate having a surface; and a layer stack on the substrate surface, including, in order from the surface: a granular magnetic recording layer; an intermediate magnetic de-coupling layer; and a corrosion preventing magnetic cap layer. The intermediate magnetic de-coupling layer has an optimal thickness and/or composition for: (1) promoting magnetic exchange de-coupling between the granular magnetic recording layer and the magnetic cap layer; and (2) reducing the dynamic closure field ($H_{cl}$) for determining writeability and eraseability of the medium. Grain boundaries of the magnetic cap layer are substantially oxide-free, and have a greater density and lower average porosity and surface roughness than those of the granular magnetic recording layer.

40 Claims, 5 Drawing Sheets

CORROSION RESISTANT GRANULAR MAGNETIC STACK

RELATED APPLICATIONS

The present application is a continuation of U.S. patent application Ser. No. 11/407,927, filed Apr. 21, 2006, naming Michael Zyee-Shan Wu, Mason Lu, Kueir W. Chour, Connie C. Liu, Edward T. Yen, Lynn Li and Steve Hwang as inventors, assigned to the assignee of the present invention. This application is incorporated herein by reference in its entirety and for all purposes.

FIELD OF THE INVENTION

The present invention relates to improved, corrosion-resistant, high recording performance magnetic recording media comprising a granular magnetic recording layer and to methods of manufacturing same. The invention has particular utility in the manufacture and use of high areal recording density, corrosion-resistant magnetic media, e.g., hard disks, utilizing granular recording layers.

BACKGROUND OF THE INVENTION

Magnetic media are widely used in various applications, particularly in the computer industry for data/information storage and retrieval applications, typically in disk form, and efforts are continually made with the aim of increasing the areal recording density, i.e., bit density of the magnetic media. Conventional thin film thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

A portion of a conventional longitudinal recording, thin-film, hard disk-type magnetic recording medium 1 commonly employed in computer-related applications is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11-14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

So-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL"), i.e., a magnetic layer having a relatively low coercivity below about 100 Oe, such as of a NiFe alloy (Permalloy), between the non-magnetic substrate, e.g., of glass, aluminum (Al) or an Al-based alloy, and the magnetically "hard" recording layer having relatively high coercivity, typically about 3-8 kOe, e.g., of a cobalt-based alloy (e.g., a Co—Cr alloy such as CoCrPtB) having perpendicular anisotropy. The magnetically soft underlayer serves to guide magnetic flux emanating from the head through the hard, perpendicular magnetic recording layer.

A typical conventional perpendicular recording system 20 utilizing a vertically oriented magnetic medium 21 with a relatively thick soft magnetic underlayer, a relatively thin hard magnetic recording layer, and a single-pole head, is illustrated in FIG. 2, wherein reference numerals 10, 11A, 4, 5, and 6, respectively, indicate a non-magnetic substrate, an adhesion layer (optional), a soft magnetic underlayer, at least one non-magnetic interlayer, and at least one perpendicular hard magnetic recording layer. Reference numerals 7 and 8, respectively, indicate the single and auxiliary poles of a single-pole magnetic transducer head 16. The relatively thin interlayer 5 (also referred to as an "intermediate" layer), comprised of one or more layers of non-magnetic materials, serves to (1) prevent magnetic interaction between the soft underlayer 4 and the at least one hard recording layer 6 and (2) promote desired microstructural and magnetic properties of the at least one hard recording layer.

As shown by the arrows in the figure indicating the path of the magnetic flux $\phi$, flux $\phi$ is seen as emanating from single pole 7 of single-pole magnetic transducer head 16, entering and passing through the at least one vertically oriented, hard magnetic recording layer 5 in the region below single pole 7, entering and traveling within soft magnetic underlayer 3 for a distance, and then exiting therefrom and passing through the at least one perpendicular hard magnetic recording layer 6 in the region below auxiliary pole 8 of single-pole magnetic transducer head 16. The direction of movement of perpendicular magnetic medium 21 past transducer head 16 is indicated in the figure by the arrow above medium 21.

With continued reference to FIG. 2, vertical lines 9 indicate grain boundaries of polycrystalline layers 5 and 6 of the layer stack constituting medium 21. Magnetically hard main recording layer 6 is formed on interlayer 5, and while the grains of each polycrystalline layer may be of differing widths (as measured in a horizontal direction) represented by a grain size distribution, they are generally in vertical registry (i.e., vertically "correlated" or aligned).

Completing the layer stack is a protective overcoat layer 14, such as of a diamond-like carbon (DLC), formed over hard magnetic layer 6, and a lubricant topcoat layer 15, such as of a perfluoropolyethylene material, formed over the protective overcoat layer.

Substrate 10 is typically disk-shaped and comprised of a non-magnetic metal or alloy, e.g., Al or an Al-based alloy, such as Al—Mg having an Ni—P plating layer on the deposition surface thereof, or substrate 10 is comprised of a suitable glass, ceramic, glass-ceramic, polymeric material, or a composite or laminate of these materials. Optional adhesion layer 11, if present, may comprise an up to about 40 Å thick layer of a material such as Ti or a Ti alloy. Soft magnetic underlayer 4 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc. Interlayer 5 typically comprises an up to about 300 Å thick layer or layers of non-magnetic material(s), such as Ru, TiCr, Ru/CoCr$_{37}$Pt$_6$, RuCr/CoCrPt, etc.; and the at least one hard magnetic layer 6 is typically comprised of an about 100 to about 250 Å thick layer(s) of Co-based alloy(s) including one or more elements selected from the group consisting of Cr, Fe, Ta, Ni, Mo, Pt, V, Nb, Ge, B, and Pd, iron nitrides or oxides, or a $(CoX/Pd \text{ or } Pt)_n$ multilayer magnetic superlattice structure, where n is an integer from about 10 to about 25. Each of the alternating, thin layers of Co-based magnetic alloy of the superlattice is from about 2 to about 3.5 Å thick, X is an element selected from the group consisting of Cr, Ta, B, Mo, Pt, W, and Fe, and each of the alternating thin, non-magnetic layers of Pd or Pt is up to about 10 Å thick. Each type of hard magnetic recording layer material has perpendicular anisotropy arising from magneto-crystalline anisotropy ($1^{st}$ type) and/or interfacial anisotropy ($2^{nd}$ type).

A currently employed way of classifying magnetic recording media is on the basis by which the magnetic grains of the recording layer are mutually separated, i.e., segregated, in order to physically and magnetically de-couple the grains and provide improved media performance characteristics. According to this classification scheme, magnetic media with Co-based alloy magnetic recording layers (e.g., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of non-magnetic oxides, nitrides, and/or carbides at the boundaries between adjacent magnetic grains to form so-called "granular" media, which oxides, nitrides, and/or carbides may be formed by introducing a minor amount of at least one reactive gas containing oxygen, nitrogen, and/or carbon atoms (e.g. $O_2$, $N_2$, $CO_2$, etc.) to the inert gas (e.g., Ar) atmosphere during sputter deposition of the Co alloy-based magnetic layer.

Magnetic recording media with granular magnetic recording layers possess great potential for achieving ultra-high areal recording densities, More specifically, magnetic recording media based upon granular recording layers offer the possibility of satisfying the ever-increasing demands on thin film magnetic recording media in terms of coercivity ($H_c$), remanent coercivity ($H_{cr}$), magnetic remanence ($M_r$), coercivity squareness (S*), signal-to-medium noise ratio (SMNR), and thermal stability, as determined by $K_\mu V$, where $K_\mu$ is the magnetic anisotropy constant of the magnetic material and V is the volume of the magnetic grain(s). In addition to the requirements imposed upon aforementioned magnetic performance parameters by the demand for high performance, high areal recording density media, increasingly more stringent demands are made on the flying height of the read/write transducer head, i.e., head-to-media separation ("HMS"). Specifically, since the read/write sensitivity (or signal) of the transducer head is inversely proportional to the spacing between the lower edge of the transducer head and the magnetic recording layer of the media, reduction of the flying height is essential.

As indicated above, current methodology for manufacturing granular-type magnetic recording media involves reactive sputtering of the magnetic recording layer in a reactive gas-containing sputtering atmosphere, e.g., an $O_2$/Ar and/or $N_2$/Ar atmosphere, in order to incorporate oxides and/or nitrides therein and achieve smaller and more isolated magnetic grains. In this regard, it is believed that the introduction of $O_2$ and/or $N_2$ into the Ar sputtering atmosphere provides a source of $O_2$ and/or $N_2$ that migrates to the inter-granular boundaries and forms non-magnetic oxides and/or nitrides within the boundaries, thereby providing a structure with reduced exchange coupling between adjacent magnetic grains. However, magnetic films formed according to such methodology typically are very porous and rough-surfaced compared to media formed utilizing conventional techniques. Corrosion and environmental testing of granular recording media indicate very poor resistance to corrosion and environmental influences, and even relatively thick carbon-based protective overcoats, e.g., ~40 Å thick, provide inadequate resistance to corrosion and environmental attack. Studies have determined that the root cause of the poor corrosion performance of granular magnetic recording media is incomplete coverage of the surface of the magnetic recording layer by the protective overcoat (typically carbon), due to high nano-scale roughness, porous oxide grain boundaries, and/or poor carbon adhesion to oxides.

Previous studies (disclosed in commonly assigned, co-pending application Ser. No. 10/776,223, filed Feb. 12, 2004, the entire disclosure of which is incorporated herein by reference) have demonstrated that corrosion performance of granular magnetic recording media may be improved by ion etching (e.g., sputter etching) the surface of the granular magnetic recording layer(s) prior to deposition thereon of the carbon protective overcoat layer. However, a disadvantage associated with such methodology is that since the magnetic recording layer(s) is (are) subject to direct ion etching, magnetic material is removed, and as a result, the magnetic properties are altered.

Another approach for improving corrosion resistance of granular magnetic recording media (disclosed in commonly assigned, co-pending application Ser. No. 11/249,469, filed Oct. 14, 2005, the entire disclosure of which is incorporated herein by reference) comprises formation of a thin, non-magnetic cap layer over the granular magnetic recording layer, followed by ion etching of the exposed surface of the cap layer prior to deposition of a protective overcoat layer (typically carbon-containing) thereon. An advantage afforded by provision of the cap layer is that the magnetic layer(s) underlying the cap layer is (are) effectively shielded from etching, hence damage, by the ion bombardment sputter etching process, and disadvantageous alteration of the magnetic properties and characteristics of the as-deposited, optimized magnetic recording layer(s) is effectively eliminated while maintaining the improved corrosion resistance of the media provided by etching of the media surface prior to deposition of the protective overcoat layer. However, a drawback of this approach is the disadvantageous increase in the HMS arising from the presence of the non-magnetic cap layer in the layer structure overlying the granular magnetic recording layer.

Yet another approach for mitigating the problem of corrosion susceptibility of granular magnetic recording media (disclosed in commonly assigned, co-pending application Ser. No. 11/154,637, filed Jun. 17, 2005, the entire disclosure of which is incorporated herein by reference) comprises formation of a thin, magnetic cap layer containing magnetic grains and non-magnetic grain boundaries over the granular magnetic recording layer prior to deposition of a protective overcoat layer (typically carbon-containing) thereon. According to this approach, the magnetic cap layer: (1) serves to protect the principal granular magnetic recording layer from corrosion; (2) has substantially oxide-free grain boundaries with higher density and lower average porosity than the grain boundaries of the principal granular magnetic recording layer; (3) has a lower average surface roughness than the principal granular magnetic recording layer; and (4) serves both as a magnetically functional layer and a corrosion protection layer, thereby mitigating the drawback associated by the increased HMS.

The continuing requirements for increased recording density and high performance of magnetic media, particularly in hard disk form, necessitates parallel increases in Bit Error Rate ("BER") and SMNR requirements. As a consequence, and notwithstanding the notable improvements in media performance afforded by the above-described principal granular magnetic recording layer+magnetic cap layer approach for providing corrosion-resistant, high areal recording density, high performance granular magnetic recording media, further improvement in granular media technology and performance for meeting the increased BER and SMNR requirements of high performance disk drives is considered of utmost significance.

In view of the foregoing, there exists a clear need for methodology for manufacturing high areal recording density, high performance granular-type longitudinal and perpendicular magnetic recording media with improved corrosion resistance and optimal magnetic properties, which methodology is fully compatible with the requirements of high product throughput, cost-effective, automated manufacture of such high performance magnetic recording media.

The present invention, therefore, addresses and solves the above-described problems, drawbacks, and disadvantages associated with the aforementioned methodology for the manufacture of high performance magnetic recording media comprising granular-type magnetic recording layers, while maintaining full compatibility with all aspects of automated manufacture of magnetic recording media.

DISCLOSURE OF THE INVENTION

An advantage of the present disclosure is improved granular longitudinal and perpendicular magnetic recording media with improved recording properties and enhanced corrosion and environmental resistance, Another advantage of the present disclosure is methods of manufacturing granular longitudinal and perpendicular granular magnetic recording media with improved recording properties and enhanced corrosion and environmental resistance.

Additional advantages and other features of the present disclosure will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a granular magnetic recording medium, comprising:
(a) a non-magnetic substrate having a surface; and
(b) a layer stack on the substrate surface, the layer stack including, in order from the surface:
    (i) a granular magnetic recording layer;
    (ii) an intermediate magnetic de-coupling layer; and
    (iii) a corrosion preventing magnetic cap layer.

According to embodiments of the present invention, the intermediate magnetic de-coupling layer is comprised of a low magnetic moment material; and has an optimal thickness and/or composition for: (1) promoting magnetic exchange de-coupling between the granular magnetic recording and magnetic cap layers; and (2) reducing the dynamic closure field ($H_{cl}$) for determining writeability and eraseability of the medium, Preferably, the intermediate magnetic de-coupling layer is from about 5 to about 20 Å thick, preferably about 12 Å thick, and comprises a CoCrX low magnetic moment alloy, wherein X is at least one non-magnetic element selected from the group consisting of B, Ru, Cu, Pt, Ta, Ti, V, Ag, Au, and W, and the at least one non-magnetic element X is segregated at grain boundaries of the intermediate magnetic de-coupling layer.

Preferred embodiments of the invention include those wherein the granular magnetic recording layer is a longitudinal or perpendicular magnetic recording layer from about 50 to about 150 Å thick, preferably about 100 Å thick, and comprises a CoPtX alloy, wherein X is at least one non-magnetic element or material selected from the group consisting of: Cr, Ta, B, Mo, V, Nb, W, Zr, Re, Ru, Cu, Ag, Hf, Ir, Y, O, Si, C, Ti, N, P, Ni, SiC, $SiO_2$, SiO, $Si_3N_4$, $Al_2O_3$, AlN, TiO, $TiO_2$, $TiO_x$, TiN, TiC, $Ta_2O_5$, NiO, CoO, $Nb_2O_5$, $WO_3$; and Co-containing magnetic grains are segregated by grain boundaries comprising at least one of non-magnetic oxides, nitrides, and carbides.

In accordance with preferred embodiments of the invention, the granular magnetic recording layer is a perpendicular magnetic recording layer and the layer stack further comprises a magnetically soft underlayer below the granular magnetic recording layer.

According to embodiments of the present invention, grain boundaries of the magnetic cap layer are substantially oxide-free, and have a greater density and lower average porosity and surface roughness than grain boundaries of the granular magnetic recording layer.

Preferably, the magnetic cap layer is from about 40 to about 90 Å thick, preferably about 65 Å thick, and comprises a CoCrPtBX alloy, wherein X is at least one non-magnetic element selected from the group selected from the group consisting of: Cu, Au, Ta, and V; and at least one of Pt, B, and the at least one non-magnetic element X is segregated at the grain boundaries of the magnetic cap layer.

Embodiments of the invention include media which further comprise:
(c) a protective overcoat layer on the magnetic cap layer.
Preferably, the protective overcoat layer comprises carbon.
Another aspect of the present invention is an improved method of manufacturing a granular magnetic recording medium, comprising sequential steps of:
(a) providing a non-magnetic substrate including a surface;
(b) forming a layer stack on the surface, the layer stack including, in order from the surface:
    (i) a granular magnetic recording layer;
    (ii) an intermediate magnetic de-coupling layer; and
    (iii) a corrosion preventing magnetic cap layer.

In accordance with embodiments of the present invention, step (b)(i) comprises forming a longitudinal or perpendicular granular magnetic recording layer wherein adjacent magnetic grains are segregated by grain boundaries comprising at least one non-magnetic material; step (b)(ii) comprises forming an intermediate magnetic de-coupling layer comprised of a low magnetic moment material, wherein the intermediate magnetic de-coupling layer has an optimal thickness and/or composition for: (1) promoting magnetic exchange de-coupling between the granular magnetic recording layer and the magnetic cap layer; and (2) reducing the dynamic closure field ($H_{cd}$) for determining writeability and eraseability of the medium; and step (b)(iii) comprises forming a magnetic cap layer which has substantially oxide-free grain boundaries, the grain boundaries of the magnetic cap layer having a greater density and lower average porosity and surface roughness than those of the granular magnetic recording layer.

Preferred embodiments of the present invention include those wherein step (b)(i) comprises forming a granular magnetic recording layer comprised of a CoPtX alloy, where X is at least one non-magnetic element or material selected from the group consisting of: Cr, Ta, B, Mo, V, Nb, W, Zr, Re, Ru, Cu, Ag, Hf, Ir, Y, O, Si, C, Ti, N, P, Ni, SiC, $SiO_2$, SiO, $Si_3N_4$, $Al_2O_3$, AlN, TiO, $TiO_2$, $TiO_x$, TiN, TiC, $Ta_2O_5$, NiO, CoO, $Nb_2O_5$, $WO_3$; and Co-containing magnetic grains are segregated by grain boundaries comprising at least one of non-magnetic oxides, nitrides, and carbides; step (b)(ii) comprises forming an intermediate magnetic de-coupling layer comprised of a CoCrX low magnetic moment alloy, where X is at least one non-magnetic element selected from the group consisting of B, Ru, Cu, Pt, Ta, Ti, V, Ag, Au, and W, and the at least one non-magnetic element X is segregated at grain boundaries of the intermediate magnetic de-coupling layer; and step (b)(iii) comprises forming a magnetic cap layer comprised of a CoCrPtBX alloy, wherein X is at least one non-magnetic element selected from the group selected from the group consisting of: Cu, Au, Ta, and V; and at least one of Pt, B, and the at least one non-magnetic element X is segregated at the grain boundaries of the magnetic cap layer.

Preferably, step (b)(i) comprises forming the granular magnetic recording layer in a thickness from about 50 to about 150 Å, preferably about 100 Å; step (b)(ii) comprises forming the intermediate magnetic layer in a thickness from about 5 to about 20 Å, preferably about 12 Å; and step (b)(iii) comprises forming the magnetic cap layer at a thickness from about 40 to about 90 Å, preferably about 65 Å.

According to further preferred embodiments of the present invention, step (b)(i) comprises forming the granular magnetic recording layer as a perpendicular recording layer and further comprises forming a magnetically soft underlayer below the perpendicular recording layer; and the method further comprises a step of:

(c) forming a protective overcoat layer on the magnetic cap layer.

Additional advantages and aspects of the disclosure will become readily apparent to those skilled in the art from the following detailed description, wherein embodiments of the present methodology are shown and described, simply by way of illustration of the best mode contemplated for practicing the present invention. As will be described, the present disclosure is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the same reference numerals are employed throughout for designating like features and the various features (e.g., layers) are not necessarily drawn to scale but rather are drawn as to best illustrate the pertinent features, wherein.

DESCRIPTION OF THE INVENTION

The present invention addresses and solves problems, disadvantages, and drawbacks associated with the aforementioned poor corrosion and environmental resistance of high performance magnetic recording media comprising granular-type magnetic recording layers, as well as the negative impact on their recording performance incurred by the above-described remedial measures undertaken for improving corrosion resistance, and is based upon investigations by the present inventors which have determined that significant improvement in the bit error rate (BER) and signal-to-media noise ratio (SMNR), as well as other recording performance characteristics of granular magnetic recording media, can be obtained without sacrifice or diminution of the advantageous improvement in corrosion resistance afforded by the above-described cap layer(s) provided over the granular magnetic recording layer(s).

The present inventors have determined that interposition of at least one tunable intermediate magnetic layer between the granular magnetic recording layer(s) (of longitudinal or perpendicular magnetic orientation) and a corrosion preventing magnetic cap layer(s) results in significant improvement in magnetic recording parameters, while maintaining the enhanced corrosion resistance provided by the magnetic cap layer(s). More specifically, the inventors have determined that interposition of such intermediate magnetic layer in proper (i.e., optimal) thickness and/or composition ranges results in significant improvement in magnetic recording parameters, including BER, SMNR, reverse overwrite, and DC noise.

It has been further determined that interposition of such intermediate magnetic layer in proper (i.e., optimal) thickness and/or composition ranges results in an optimal amount of magnetic exchange de-coupling between the granular longitudinal or perpendicular magnetic recording layer(s) and the cap layer(s). Micro-magnetic modeling based upon input of measured magnetic properties of embodiments of the present invention indicate that a significant reduction in the dynamic closure field (Ii) is realized within certain thickness and/or composition ranges of the intermediate magnetic layer, which dynamic closure field is an important variable in determining eraseability/writeability of the medium.

Figure 2:
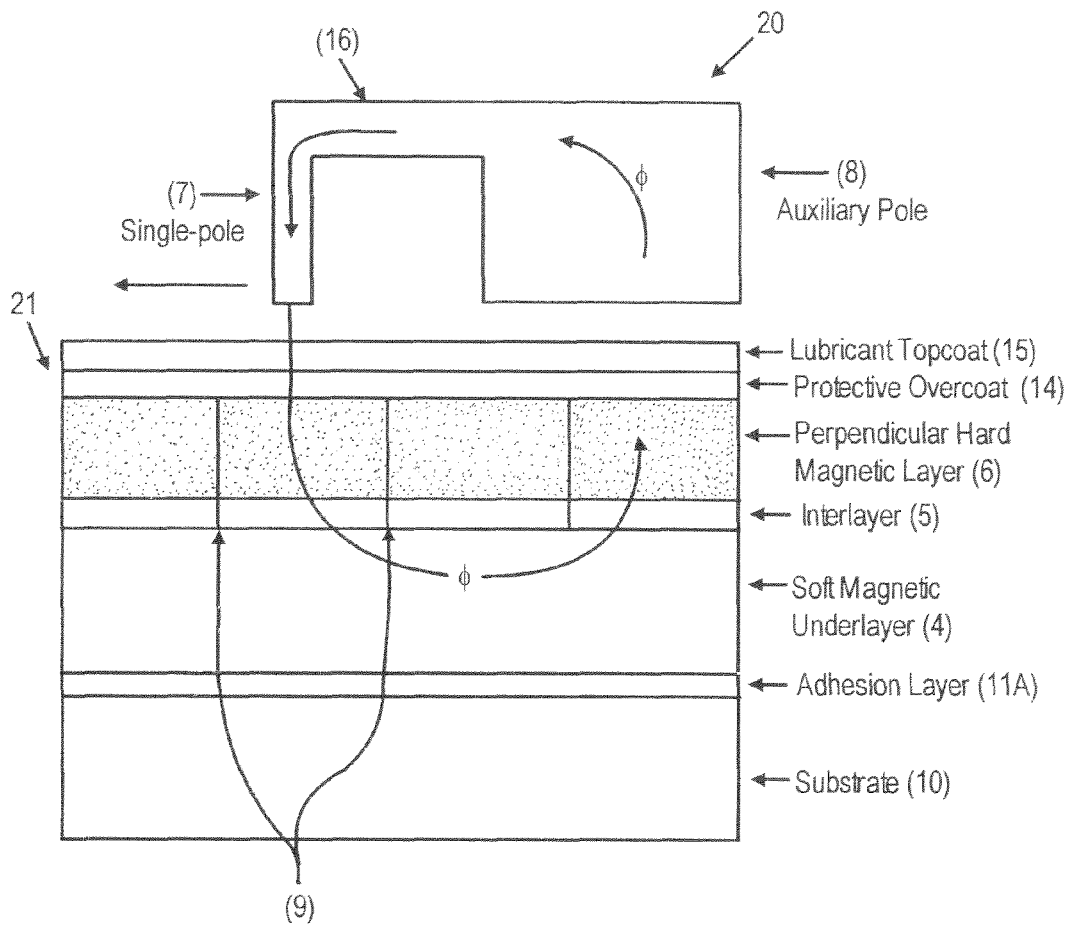
FIG. 2 schematically illustrates, in simplified cross-sectional view, a portion of a magnetic recording storage, and retrieval system comprised of a perpendicular magnetic recording medium and a single pole transducer head.
Figure 3:
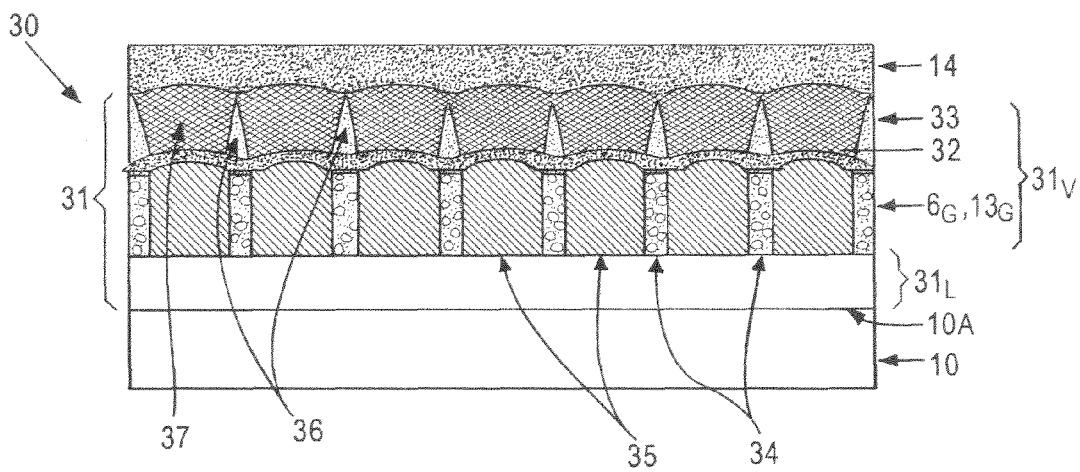
FIG. 3 schematically illustrates, in simplified cross-sectional view, a portion of a thin film magnetic recording medium according to the present invention and comprising a layer stack including granular magnetic recording, intermediate magnetic de-coupling, and magnetic cap layers.

Referring now to FIG. 3, shown therein, in simplified cross-sectional view, is a portion of an illustrative, but non-limitative, embodiment of a thin film magnetic recording medium 30 according to the present invention. As illustrated, medium 30 includes a non-magnetic substrate 10, typically disk-shaped and comprised of a non-magnetic material selected from the group consisting of: Al, NiP-plated Al, Al—Mg alloys, other Al-based alloys, other non-magnetic metals, other non-magnetic alloys, glass, ceramics, polymers, glass-ceramics, and composites and laminates of the aforementioned materials. Layer stack 31 comprising a plurality of stacked thin film layers, is formed on surface 10A of substrate 10, and for purposes of the following description, comprises a lower portion $31_L$ and an upper portion $31_U$. In embodiments according to the invention wherein medium 30 is structured as a longitudinal magnetic recording medium, lower portion $31_L$ typically includes a plurality of layers, such as plating, seed, and interlayers, functionally similar to layers 11, 12A, and 12B described above in connection with conventional longitudinal medium 1 shown in FIG. 1; whereas, in embodiments according to the invention wherein medium 30 is structured as a perpendicular magnetic recording medium, lower portion $31_L$ typically includes a plurality of layers, such as adhesion, soft magnetic underlayer (SUL), and interlayers, functionally similar to layers 11A, 4, and 5 described above in connection with conventional perpendicular medium 20 shown in FIG. 2.

Figure 1:
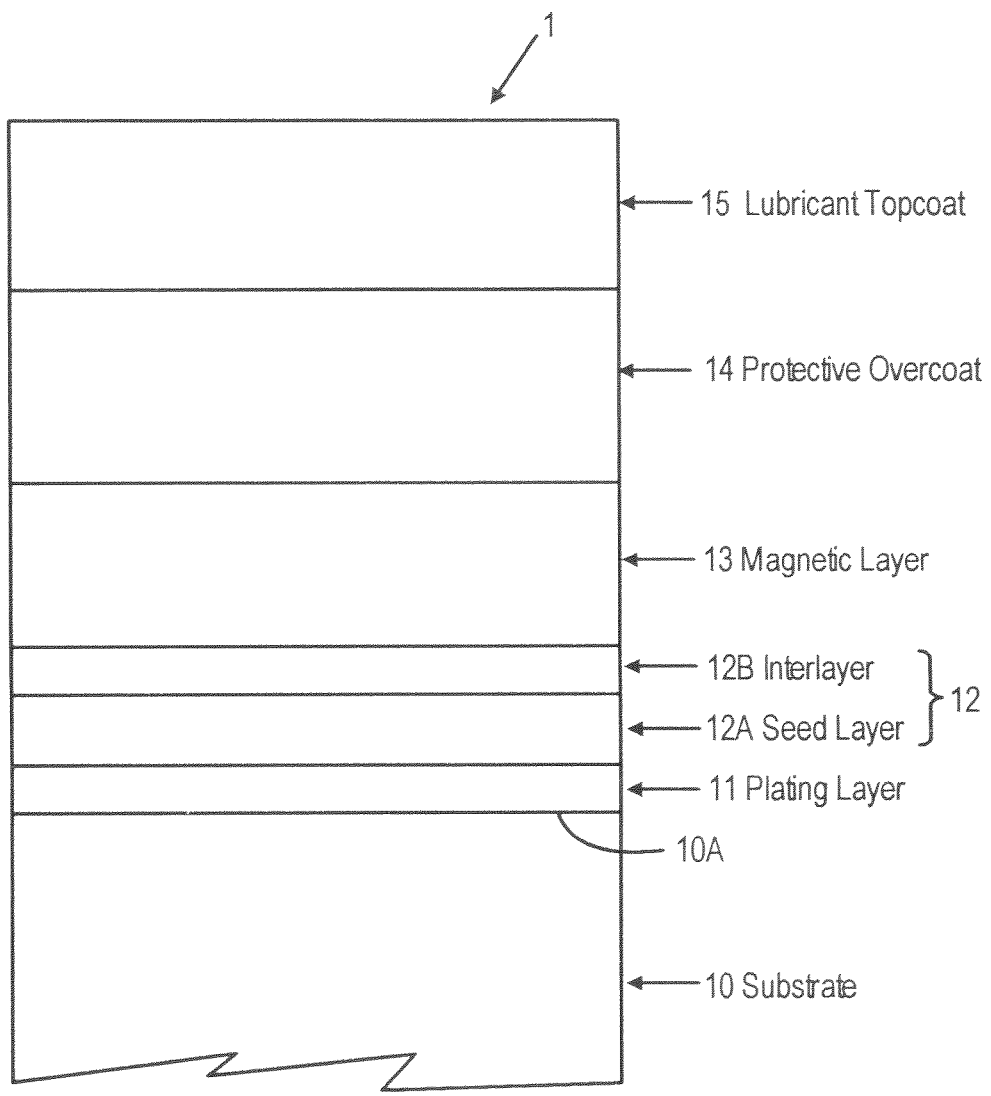
FIG. 1 schematically illustrates, in simplified cross-sectional view, a portion of a conventional thin film longitudinal magnetic recording medium.

Still referring to FIG. 3, according to embodiments of the present invention wherein medium 30 is structured as a longitudinal magnetic recording medium, upper portion $31_U$ of layer stack 31 includes a granular longitudinal magnetic recording layer $13_G$, analogous to the conventional longitudinal magnetic recording layer 13 of conventional longitudinal medium 1 shown in FIG. 1; whereas, according to embodiments of the present invention wherein medium 30 is structured as a perpendicular magnetic recording medium, upper portion $31_U$ of layer stack 31 includes a granular perpendicular hard magnetic recording layer $6_G$, analogous to the conventional perpendicular hard magnetic recording layer 6 of conventional perpendicular medium 20 shown in FIG. 2.

According to preferred embodiments of the invention, granular longitudinal magnetic recording layer $13_G$ and granular perpendicular hard magnetic recording layer $6_G$ are each from about 50 to about 150 Å thick, preferably about 100 Å thick, and comprised of a CoPtX alloy, wherein X is at least one non-magnetic element or material selected from the group consisting of: Cr, Ta, B, Mo, V, Nb, W, Zr, Re, Ru, Cu, Ag, Hf, Ir, Y, O, Si, C, Ti, N, P, Ni, SiC, $SiO_2$, SiO, $Si_3N_4$, $Al_2O_3$, AlN, TiO, $TiO_2$, $TiO_x$, TiN, TiC, $Ta_2O_5$, NiO, CoO, $Nb_2O_5$, $WO_3$; and Co-containing magnetic grains 35 are segregated by grain boundaries 34 comprising at least one of non-magnetic oxides, nitrides, and carbides.

Granular longitudinal magnetic recording layer $13_G$ and granular perpendicular hard magnetic recording layer $6_G$ may each be formed by reactive sputter deposition techniques, e.g., magnetron sputtering, wherein segregation of the magnetic grains 35 occurs by formation of non-magnetic oxides, nitrides, and/or carbides at the boundaries 34 between adjacent magnetic grains, which oxides, nitrides, and/or carbides are formed by introducing a minor amount of at least one reactive gas containing oxygen, nitrogen, and/or carbon atoms (e.g. $O_2$, $N_2$, $CO_2$, etc.) to the inert gas (e.g., Ar) atmosphere during sputter deposition of the Co alloy-based magnetic layer.

In a preferred embodiment, the granular magnetic recording layer is deposited on a suitable under- or biter-layer so as to grow with an hcp <0001> preferred growth orientation, and comprises a CoPtX alloy including at least one non-magnetic element X such as enumerated above. Preferably, the Pt concentration is >~10 at. %. The granular magnetic recording layer is deposited so as to form a compositionally segregated microstructure wherein the magnetic particles or grains 35 comprise higher concentrations of Co and Pt than the boundaries 34 between adjacent grains, while the grain boundaries comprise higher concentrations of other non-magnetic elements and lower Co concentration, such that the boundaries 34 are substantially non-magnetic. According to one embodiment, the non-magnetic grain boundaries 34 comprise CoO, whereas, according to another embodiment, the non-magnetic material of the grain boundaries 34 comprises an oxide, nitride, or carbide material derived from a sputtering target. According to an especially preferred embodiment, the granular magnetic recording layer is sputter-deposited at a pressure >~20 mTorr and from about 5 to about 50 vol. % of the layer is comprised of non-magnetic grain boundary material.

According to the invention, intermediate magnetic de-coupling layer 32 is formed in overlying contact with granular longitudinal magnetic recording layer $13_G$ or granular perpendicular hard magnetic recording layer $6_G$. Layer 32 is comprised of an amorphous or crystalline low magnetic moment material and has an optimal thickness and/or composition for: (1) promoting magnetic exchange de-coupling between underlying granular magnetic recording layer(s) and overlying magnetic cap layer(s); and (2) reducing the dynamic closure field ($H_{cl}$) for determining writeability and eraseability of the medium.

Preferably, the intermediate magnetic de-coupling layer 32 is from about 5 to about 20 Å thick, preferably about 12 Å thick, and comprises a CoCrX low magnetic moment alloy, wherein X is at least one non-magnetic element selected from the group consisting of: B, Ru, Cu, Pt, Ta, Ti, V, Ag, Au, and W, and the at least one non-magnetic element X is segregated at grain boundaries of the intermediate magnetic de-coupling layer.

Figures 9, 10:
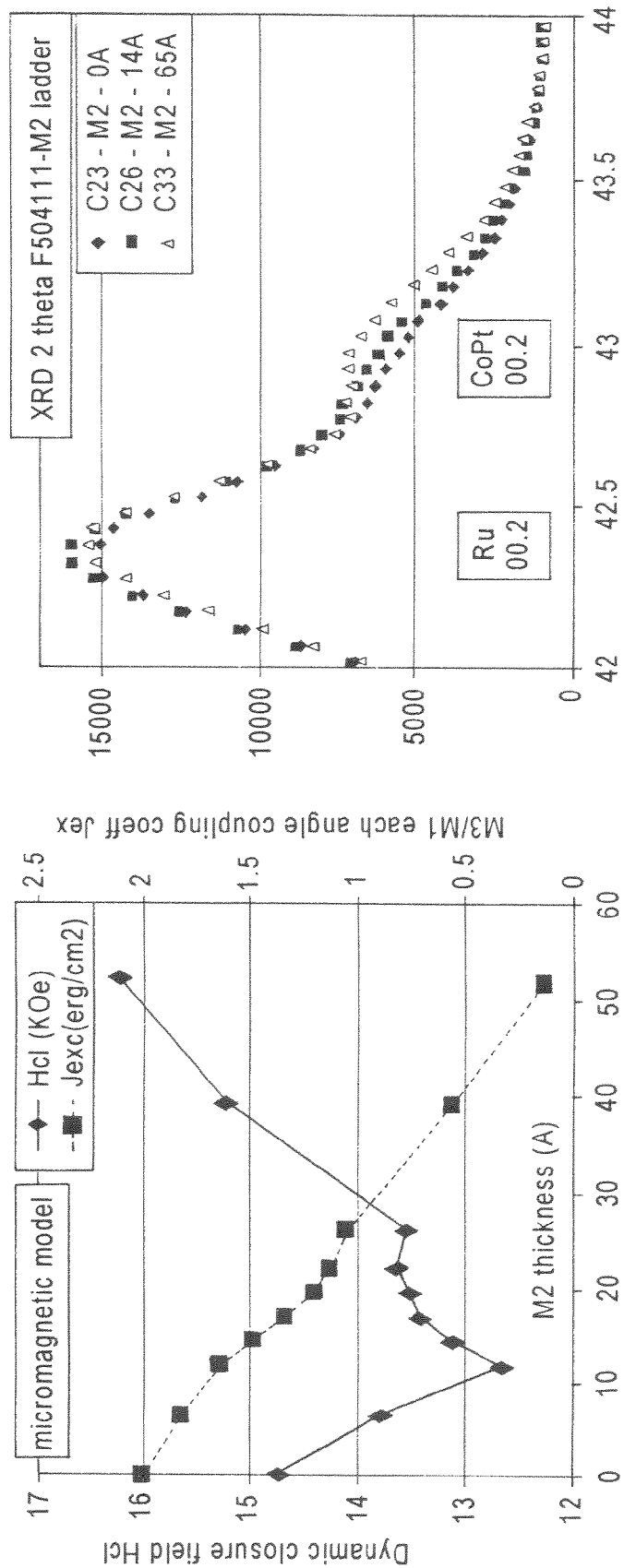
FIG. 10 is a graph illustrating X-Ray diffraction analysis of thin film granular magnetic recording media structured according to the present invention, as a function of M2 thickness.

Formation of the intermediate magnetic de-coupling layer 32 can be accomplished by sputter deposition similar to that utilized for conventional longitudinal media fabrication, i.e., without oxide additives to the sputtering target or addition of reactive gas(es) to the sputtering atmosphere. During deposition of layer 32, electrical bias and heat may be supplied to the substrate to promote segregation of the non-magnetic element(s) at grain boundaries of the layer, so as to provide a suitable foundation for subsequent epitaxial growth of the corrosion preventing magnetic cap layer thereon with dense, non-porous grain boundaries for blocking ingress/permeation of the medium with corrosive oxygen and other environmental substances, as described below. X-Ray analysis, as shown in the graph of FIG. 10, indicates that insertion of the intermediate magnetic de-coupling layer 32 between an underlying granular magnetic recording layer(s) and overlying magnetic cap layer(s) does not degrade the epitaxial structure of the latter layers. In addition, presence of the intermediate magnetic de-coupling layer 32 between the granular magnetic recording and magnetic cap layers may result in enhancement of the crystal structure integrity and corrosion protection of the magnetic cap layer.

Corrosion preventing magnetic cap layer 33 is formed in overlying contact with intermediate magnetic de-coupling layer 32. According to embodiments of the invention, grain boundaries 36 of the magnetic cap layer 33 are substantially oxide-free, and have a greater density and lower average porosity and surface roughness than grain boundaries 35 of the granular magnetic recording layer 13$_G$ or 6$_G$ for inhibiting/blocking ingress/permeation of the medium with corrosive oxygen and other environmental substances, thereby preventing, or at least substantially minimizing, deleterious environmentally-induced corrosion of the medium.

Preferably, the magnetic cap layer 33 is from about 40 to about 90 Å thick, preferably about 65 Å thick, and according to embodiments of the invention, comprises a CoCrPtBX alloy, wherein X is at least one non-magnetic element selected from the group selected from the group consisting of: Cu, Au, Ta, and V; and at least one of Pt, B, and the at least one non-magnetic element X is segregated at the grain boundaries 36 of the magnetic cap layer.

According to other preferred embodiments of the invention, the magnetic cap layer 33 comprises a <0001> growth oriented film, which can be sputter deposited at a gas pressure <~20 mTorr. The magnetic cap layer is also preferably deposited without reactive oxidation, so as to form a denser microstructure than that of the granular magnetic recording layer 13$_G$ or 6$_G$. According to further embodiments of the invention, the sputtering is either oxide-free or reduced in oxide content vis-à-vis the sputtering target utilized for depositing the granular magnetic recording layer. In each of the embodiments, the overall concentration of non-magnetic elements, and specifically the concentration of non-magnetic materials at the grain boundaries 36 between adjacent magnetic particles or grains 37 of the magnetic cap layer 33, is lower than in the granular magnetic recording layer 13$_G$ or 6$_G$.

Medium 30 further comprises a protective overcoat layer 14, typically an about 25 to about 45 Å thick, preferably about 35 Å thick, layer of a carbon-containing material, such as an amorphous or diamond-like carbon (DLC) material, formed by a conventional deposition process, e.g., sputtering or ion beam deposition (IBD), in overlying contact with the magnetic cap layer 33. A suitably thick lubricant topcoat layer (not shown in FIG. 3 for illustrative simplicity), such as of a perfluoropolyether material, is formed (in conventional manner, e.g., by clipping, etc.) over the protective overcoat layer 14.

FIGS. 4-9 graphically illustrate the behavior of various magnetic recording performance parameters of thin film granular magnetic recording media structured according to the present invention, as a function of thickness of the intermediate magnetic de-coupling layer or the remanent coercivity ($H_{cr}$) of the media, wherein M1, M2, and M3 designate the granular magnetic recording, intermediate magnetic de-coupling, and corrosion preventing magnetic cap layers, respectively.

Figure 4:
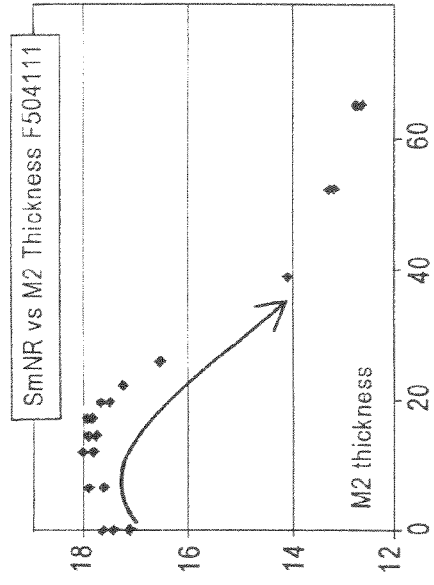
FIGS. 4-9 are graphs illustrating various magnetic recording performance parameters of thin film granular magnetic recording media structured according to the present invention, wherein M1, M2, and M3 designate the granular magnetic recording, intermediate magnetic de-coupling, and corrosion preventing magnetic cap layers, respectively.
Figure 5:
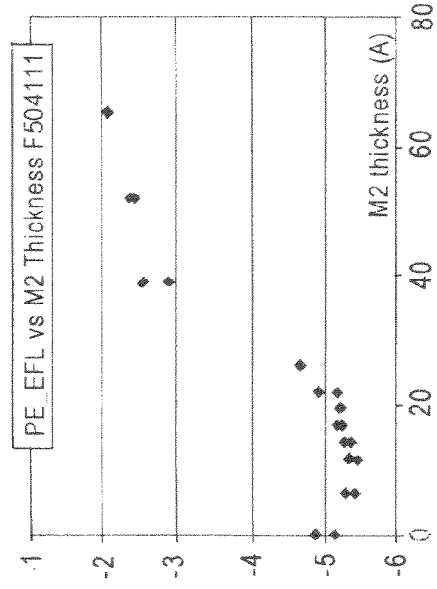

More specifically, FIG. 4 illustrates the variation of PE-EFL (position error rate@error rate floor) as a function of thickness of the intermediate magnetic de-coupling layer M2; and FIG. 5 illustrates the variation of SMNR (signal-to-media noise ratio) as a function of thickness of the intermediate magnetic de-coupling layer M2. In each instance, improvement of the relevant media performance parameter is observed when M2≤20 Å.

Figure 6:
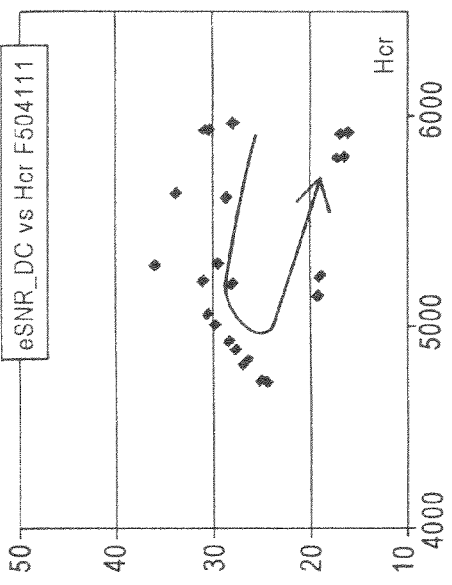
Figure 7:
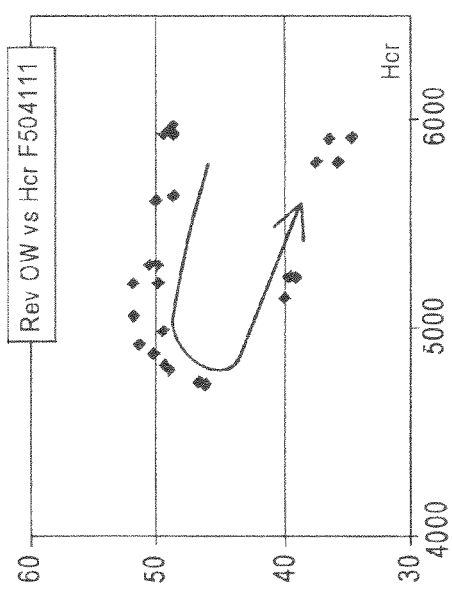

FIG. 6 illustrates the variation of Rev OW (reverse over-write) as a function of the remanent coercivity ($H_{cr}$) of the media; and FIG. 7 illustrates the variation of the eSNR-DC (equalized signal-to-noise ratio-DC) as a function of the remanent coercivity ($H_{cr}$) of the media. In each instance, it is observed that reverse over-write and media DC erase noise (eSNR-DC) are improved only within the $H_{cr}$ range dictated by the M2 thickness.

Figure 8:
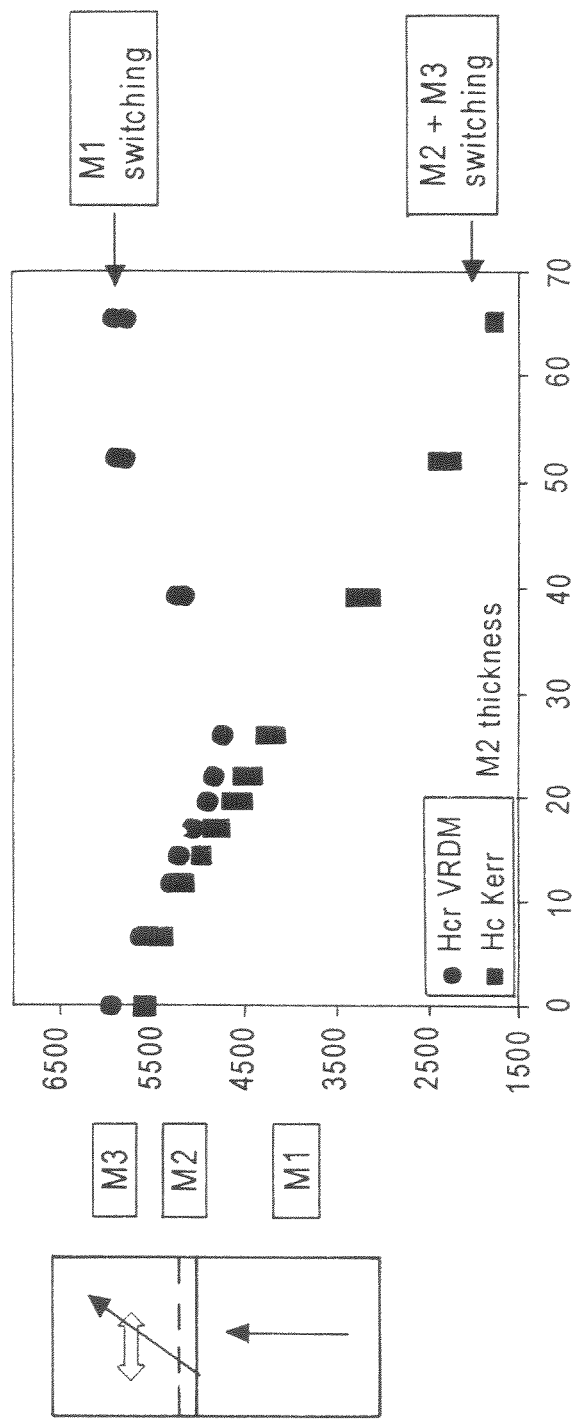

FIG. 8 illustrates the variation of $H_{cr}$ (remanent coercivity) and (coercivity) as a function of thickness of the intermediate magnetic de-coupling layer M2, from which it is seen that de-coupling between M1 and M3 is useful only within a specific range of M2 thickness. M1 would be completely magnetically separated from M2 and M3 beyond the useful range of M2 thickness.

FIG. 9 illustrates the variation of $H_{cl}$ (dynamic closure field) and $J_{exc}$ (exchange coupling coefficient) as a function of thickness of the intermediate magnetic de-coupling layer M2, from which it is seen that a significant reduction in dynamic closure field is realized that leads to improved writeability within a specific range of M2 thickness.

The present invention thus advantageously provides high quality, corrosion-resistant, high areal recording density longitudinal and perpendicular granular magnetic recording media with improved BER and SMNR, as well as enhancement of other pertinent magnetic recording characteristics. Moreover, the inventive methodology can be practiced in a cost-effective manner, utilizing conventional manufacturing technology and equipment (e.g., sputtering technology and equipment) for automated, large-scale manufacture of magnetic recording media, such as hard disks. Finally, the invention is not limited to use with hard disks, but rather is broadly applicable to the formation of thermally stable, high SNR, high areal density magnetic recording media suitable for use in all manner of devices, products, and applications.

In the previous description, numerous specific details are set forth, such as specific materials, structures, processes, etc., in order to provide a better understanding of the present invention. However, the present invention, can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

The invention claimed is:

1. A magnetic recording stack comprising:
   a magnetic recording layer comprising a plurality of grains separated by a plurality of grain boundaries;
   a magnetic decoupling layer disposed on said magnetic recording layer,
      wherein said magnetic decoupling layer is configured to provide a dynamic closure field associated with writing and erasing of said magnetic recording stack less than 14kOe; and
   a magnetic cap layer disposed on said magnetic decoupling layer.

2. The magnetic recording stack of claim 1, wherein said magnetic recording layer is selected from a group consisting of a longitudinal magnetic recording layer and a perpendicular magnetic recording layer.

3. The magnetic recording stack of claim 1, wherein said magnetic recording layer comprises a CoPtX material, and wherein X is selected from a group consisting of Cr, Ta, B, Mo, V, Nb, W, Zr, Re, Ru, Cu, Ag, Hf, Ir, Y, O, Si, C, Ti, N, P, Ni, SiC, $SiO_2$, SiO, $Si_3N_4$, $Al_2O_3$, AlN, TiO, $TiO_2$, $TiO_x$, TiN, TiC, $Ta_2O_5$, NiO, CoO, $Nb_2O_5$, and $WO_3$.

4. The magnetic recording stack of claim 1, wherein said magnetic decoupling layer has a thickness within a range of approximately 5 Å to approximately 20 Å.

5. The magnetic recording stack of claim 1, wherein said plurality of grains of said magnetic recording layer comprise Co, and wherein said plurality of grain boundaries comprise a material selected from a group consisting of non-magnetic oxides, nitrides, and carbides.

6. The magnetic recording stack of claim 1, wherein said magnetic recording layer has a thickness within a range of approximately 50 Å to approximately 150 Å.

7. The magnetic recording stack of claim 1, further comprising:
a non-magnetic substrate; and
a layer stack formed on said non-magnetic substrate,
wherein said magnetic recording layer is disposed on said layer stack, and
wherein said layer stack comprises
a plurality of layers selected from a group consisting of plating layers, seed layers, and interlayers or
a plurality of layers selected from a group consisting of adhesion layers, soft magnetic underlayers, and interlayers.

8. The magnetic recording stack of claim 1, wherein said magnetic cap layer comprises a CoCrPtBX material, and wherein said X is selected from a group consisting of Cu, Au, Ta, and V.

9. The magnetic recording stack of claim 1, wherein said magnetic cap layer has a lower surface roughness than said magnetic recording layer.

10. The magnetic recording stack of claim 1, wherein each of said magnetic recording layer and magnetic cap layer comprises a <0001> growth orientation.

11. The magnetic recording stack of claim 1, wherein said magnetic cap layer has a thickness within a range of approximately 40 Å to approximately 90 Å.

12. The magnetic recording stack of claim 1, further comprising:
a protective overcoat layer disposed on said magnetic cap layer, wherein said protective overcoat layer comprises carbon.

13. The magnetic recording stack of claim 1, wherein said magnetic decoupling layer comprises a CoCrX material, and wherein said X is selected from a group consisting of B, Ru, Cu, Pt, Ta, Ti, V, Ag, Au, and W.

14. The magnetic recording stack of claim 13, wherein said magnetic decoupling layer comprises a plurality of grain boundaries, and wherein said X is segregated at said plurality of grain boundaries.

15. The magnetic recording stack of claim 1, wherein said magnetic cap layer has a denser microstructure than that of said magnetic recording layer.

16. The magnetic recording stack of claim 15, wherein said magnetic cap layer comprises a plurality of grains separated by a plurality of grain boundaries.

17. The magnetic recording stack of claim 16, wherein the concentration of non-magnetic elements or materials at said plurality of grain boundaries of said magnetic cap layer is lower than the concentration of non-magnetic elements or materials at said plurality of grain boundaries of said magnetic recording layer.

18. The magnetic recording stack of claim 16, wherein said plurality of grain boundaries of said magnetic cap layer have a greater density than said plurality of grain boundaries of said magnetic recording layer providing said denser microstructure.

19. The magnetic recording stack of claim 16, wherein said plurality of grain boundaries of said magnetic cap layer are substantially oxide-free.

20. The magnetic recording stack of claim 16, wherein said plurality of grain boundaries of said magnetic cap layer have a lower average porosity than said plurality of grain boundaries of said magnetic recording layer.

21. A method of manufacturing a magnetic recording stack, said method comprising:
forming a magnetic recording layer comprising a plurality of grains separated by a plurality of grain boundaries;
forming a magnetic decoupling layer on said magnetic recording layer,
wherein said magnetic decoupling layer is configured to provide a dynamic closure field associated with writing and erasing of said magnetic recording stack less than 14 kOe; and
forming a magnetic cap layer on said magnetic decoupling layer.

22. The method of claim 21, wherein said magnetic recording layer is selected from a group consisting of a longitudinal magnetic recording layer and a perpendicular magnetic recording layer.

23. The method of claim 21, wherein said magnetic recording layer comprises a CoPtX material, and wherein X is selected from a group consisting of Cr, Ta, B, Mo, V, Nb, W, Zr, Re, Ru, Cu, Ag, Hf, Ir, Y, O, Si, C, Ti, N, P, Ni, SiC, $SiO_2$, SiO, $Si_3N_4$, $Al_2O_3$, AlN, TiO, $TiO_2$, $TiO_x$, TiN, TiC, $Ta_2O_5$, NiO, CoO, $Nb_2O_5$, and $WO_3$.

24. The method of claim 21, wherein said magnetic decoupling layer has a thickness within a range of approximately 5 Å to approximately 20 Å.

25. The method of claim 21, wherein said plurality of grains of said magnetic recording layer comprise Co, and wherein said plurality of grain boundaries comprise a material selected from a group consisting of non-magnetic oxides, nitrides, and carbides.

26. The method of claim 21, wherein said magnetic recording layer has a thickness within a range of approximately 50 Å to approximately 150 Å.

27. The method of claim 21, further comprising:
forming a layer stack on a non-magnetic substrate,
wherein said forming said magnetic recording layer further comprises forming said magnetic recording layer on said layer stack, and
wherein said layer stack comprises
a plurality of layers selected from a group consisting of plating layers, seed layers, and interlayers or
a plurality of layers selected from a group consisting of adhesion layers, soft magnetic underlayers, and interlayers.

28. The method of claim 21, wherein said magnetic cap layer comprises a CoCrPtBX material, and wherein said X is selected from a group consisting of Cu, Au, Ta, and V.

29. The method of claim 21, wherein said magnetic cap layer has a lower surface roughness than said magnetic recording layer.

30. The method of claim 24, wherein each of said magnetic recording layer and magnetic cap layer comprises a <0001> growth orientation.

31. The method of claim 2, wherein said magnetic cap layer has a thickness within a range of approximately 40 Å to approximately 90 Å.

32. The method of claim 21, further comprising:
forming a protective overcoat layer on said magnetic cap layer, wherein said protective overcoat layer comprises carbon.

33. The method of claim 21, wherein said magnetic decoupling layer comprises a CoCrX material, and wherein said X is selected from a group consisting of B, Ru, Cu, Pt, Ta, Ti, V, Ag, Au, and W.

34. The method of claim 33, wherein said magnetic decoupling layer comprises a plurality of grain boundaries, and wherein said X is segregated at said plurality of grain boundaries.

35. The method of claim 21, wherein said magnetic cap layer has a denser microstructure than that of said magnetic recording layer.

36. The method of claim 35, wherein said magnetic cap layer comprises a plurality of grains separated by a plurality of grain boundaries.

37. The method of claim 36, wherein the concentration of non-magnetic elements or materials at said plurality of grain boundaries of said magnetic cap layer is lower than the concentration of non-magnetic elements or materials at said plurality of grain boundaries of said magnetic recording layer.

38. The method of claim 36, wherein said plurality of grain boundaries of said magnetic cap layer have a greater density than said plurality of grain boundaries of said magnetic recording layer providing said denser microstructure.

39. The method of claim 36, wherein said plurality of grain boundaries of said magnetic cap layer are substantially oxide-free.

40. The method of claim 36, wherein said plurality of grain boundaries of said magnetic cap layer have a lower average porosity than said plurality of grain boundaries of said magnetic recording layer.

* * * * *

UNITED STATES PATENT AND TRADEMARK OFFICE
CERTIFICATE OF CORRECTION

PATENT NO. : 8,728,637 B2
APPLICATION NO. : 12/687751
DATED : May 20, 2014
INVENTOR(S) : Michael Zyee-Shan Wu Page 1 of 1

It is certified that error appears in the above-identified patent and that said Letters Patent is hereby corrected as shown below:

In the claims, column 14, claim 30, line 58, replace "24" with --21-- column 14, claim 31, line 61, replace "2" with --21--

Signed and Sealed this
Fifth Day of August, 2014

Michelle K. Lee
*Deputy Director of the United States Patent and Trademark Office*